United States Patent
Tachibana

Patent Number: 5,553,037
Date of Patent: Sep. 3, 1996

[54] MAGNETO-OPTICAL RECORDING-REPRODUCING SYSTEM IN WHICH A MAGNETIC HEAD BOTTOM SURFACE ROUGHNESS IS RELATED TO A RECORDING MEDIUM PROTECTIVE FILM SURFACE ROUGHNESS

[75] Inventor: Shinichi Tachibana, Yamato, Japan

[73] Assignee: Canon Kabushiki Kaisha, Tokyo, Japan

[21] Appl. No.: 358,097

[22] Filed: Dec. 16, 1994

[30] Foreign Application Priority Data

Dec. 20, 1993 [JP] Japan ................... 5-320291

[51] Int. Cl.$^6$ .................. G11B 11/14; G11B 13/04
[52] U.S. Cl. ............ 369/13; 369/288; 369/275.2; 360/114; 360/103
[58] Field of Search ............. 369/13, 14, 283, 369/284, 288, 100, 44.11, 275.5, 275.1, 275.3, 280, 286; 360/103, 104, 109, 114, 105, 75, 59; 428/694 SC, 694 MM

[56] References Cited

U.S. PATENT DOCUMENTS

| | | | |
|---|---|---|---|
| 5,128,922 | 7/1992 | Inui et al. | 369/280 |
| 5,179,546 | 1/1993 | Anzai et al. | 369/275.1 |
| 5,191,563 | 3/1993 | Lee et al. | 369/13 |
| 5,416,754 | 5/1995 | Washo | 369/13 |

FOREIGN PATENT DOCUMENTS

| | | |
|---|---|---|
| 0461911 | 12/1991 | European Pat. Off. |
| 0588647 | 3/1994 | European Pat. Off. |
| 63-217548 | 9/1988 | Japan |

OTHER PUBLICATIONS

Patent Abstracts of Japan, Kokai No. 4-019842, vol. 16, No. 179, Jan. 1992.
Patent Abstracts of Japan, Kokai No. 5-002790, vol. 17, No. 262, Jan. 1993.
Patent Abstracts of Japan, Kokai No. 5-159397, vol. 17, No. 563, Jun. 1993.
Patent Abstracts of Japan, Kokai No. 5-225630, vol. 17, No. 681, Sep. 1993.
Patent Abstracts of Japan, Kokai No. 3-66079, vol. 15, No. 226, Jun. 1991.
Patent Abstracts of Japan, Kokai No. 4-184730, vol. 16, No. 506, Oct. 1992.
Patent Abstracts of Japan, Kokai No. 4-64936, vol. 16, No. 264, Jun. 1992.
Patent Abstracts of Japan, Kokai No. 4-195748, vol. 16, No. 527, Oct. 1992.
Patent Abstracts of Japan, Kokai No. 4-195746, vol. 16, No. 527, Oct. 1992.

*Primary Examiner*—Ali Neyzari
*Attorney, Agent, or Firm*—Fitzpatrick, Cella, Harper & Scinto

[57] ABSTRACT

In a magnetic field modulation type overwrite magneto-optical recording-reproducing system for effecting the recording of information on a magneto-optical recording medium with the bottom surface of a magnetic head floated and moved relative to a protective film formed on the surface of the magneto-optical recording medium, the surface roughness $\alpha$ of the bottom surface of the magnetic head represented by the center line average peak height ($R_{pm}$) and the surface roughness $\beta$ of the protective film of the magneto-optical recording medium satisfy the relational expression that $0.15 \ \mu m \leq (\alpha+\beta) \leq 1.0 \ \mu m$.

5 Claims, 1 Drawing Sheet

FIGURE
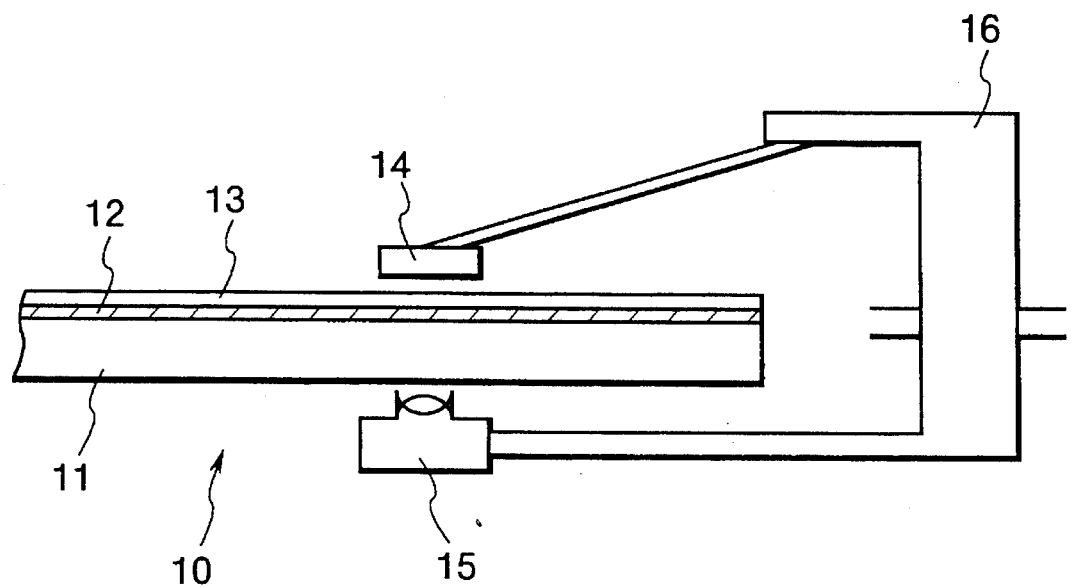

MAGNETO-OPTICAL RECORDING-REPRODUCING SYSTEM IN WHICH A MAGNETIC HEAD BOTTOM SURFACE ROUGHNESS IS RELATED TO A RECORDING MEDIUM PROTECTIVE FILM SURFACE ROUGHNESS

BACKGROUND OF THE INVENTION

1. Field of the Invention

This invention relates to a magneto-optical recording-reproducing system capable of recording, reproducing and/or erasing information on a recording medium by the use of a beam of light and a magnetic field.

2. Related Background Art

A magneto-optical recording-reproducing system capable of rewriting by the use of a magneto-optical disc as a recording medium is utilized in a data file system or the like because of its high recording density, its great recording capacity and the portability of the recording medium.

In a system according to the prior art, in a case of data rewriting, a first scanning in which a bias magnetic field is first applied to a desired portion to be rewritten in a direction opposite to that during recording and light is continuously applied thereto has been effected to thereby erase old data, and then a second scanning in which the direction of the bias magnetic field is made equal to the direction of recording relative to said desired portion in which the old data have been erased and light modulated in conformity with information is applied to said desired portion has been effected to thereby record new data. In such a method, however, a considerable time is required for access and a large amount of electrical power is required for a bias coil.

So, in recent years, two overwriting methods, i.e., a magnetic field modulation overwrite system and a light intensity modulation overwrite system, have been studied and developed [e.g. *the Transactions of the Institutes of Electronics, Information and Communication Engineers of Japan*, MR87-61, pp. 19–25 (1987)].

The magnetic field modulation system is a method of providing a floating magnetic head on a side opposite to the light incidence side of a magneto-optical recording medium, rapidly reversing the direction of a bias magnetic field by the floating magnetic head while applying a laser beam, thereby overwriting, and the size of a recording bit is determined by the spot diameter of the laser beam and the magnetic field reversing time of the floating magnetic head [e.g. Japanese Laid-Open Patent Application No. 63-217548]. On the other hand, the light intensity modulation system is one such that two recording layers are formed and one of the two layers is used as a bias layer and recording/erasing is effected by the magnitude of the power of a laser beam.

The present invention is related to the former, i.e., the magnetic field modulation system. In the magnetic field modulation system, a floating magnetic head formed of a ferrite material such as Mn-Zn ferrite is operated in synchronism with an optical head unit on the light incidence side and therefore, a floating mechanism is simplified as much as possible and the weight thereof is reduced. The magnetic head is in contact with the surface of a magneto-optical disc in a state in which rotation of the magneto-optical disc is stopped. In a recording/reproducing operation, the magneto-optical disc starts to be rotated and the magnetic head slides on the surface of the magneto-optical disc and then floats. When the recording/reproducing operation is completed, the rotation of the magneto-optical disc is stopped again and the magnetic head slides on the surface of the magneto-optical disc to thereby come into contact therewith and stop. Such series of operations are called a CSS (Contact Start and Stop) system. In order to improve the durability due to the contact and sliding in this CSS system, the magnetic thin film of the magneto-optical disc is spin-coated with an ultraviolet ray setting type resin to thereby form a protective film.

In the recording-reproducing system using the magneto-optical disc as described above, however, the surface of the magnetic head and the surface of the protective film of the magneto-optical disc contact each other during the CSS and therefore, there has been the technical problem that the magnetic head is often stuck to the magneto-optical disc, whereby good access and good recording, reproduction and erasing of information are hampered.

SUMMARY OF THE INVENTION

In view of such a problem, the present invention intends to suppress the occurrence of the sticking of a magnetic head to a magneto-optical disc in a magneto-optical recording-reproducing system to thereby secure the good floating movability of the magnetic head and make good access and good recording, reproduction and erasing of information possible.

According to the present invention, in order to achieve the above object, there is provided a magnetic field modulation type overwrite magneto-optical recording-reproducing system for effecting the recording of information on a magneto-optical recording medium with the bottom surface of a magnetic head floated and moved relative to a protective film formed on the surface of the magneto-optical recording medium, characterized in that the surface roughness $\alpha$ of the bottom surface of the magnetic head represented by the center line average peak height ($R_{pm}$) and the surface roughness $\beta$ of the protective film of the magneto-optical recording medium satisfy the relation that $$0.15 \; \mu m \leq (\alpha + \beta) \leq 1.0 \; \mu m.$$

In one embodiment of the present invention, the CSS system is adopted. Further, in one embodiment of the present invention, the surface roughness of the bottom surface of the magnetic head is formed by unevenness having directionality along the direction of movement relative to the magneto-optical recording medium.

BRIEF DESCRIPTION OF THE DRAWING

The Figure shows the manner of recording in the magnetic field modulation type overwrite magneto-optical recording-reproducing system of the present invention.

DESCRIPTION OF THE PREFERRED EMBODIMENT

A specific embodiment of the present invention will hereinafter be described with reference to the drawing.

The Figure shows the manner of recording in the magnetic field modulation type overwrite magneto-optical recording-reproducing system of the present invention. As shown in the Figure, a floating magnetic head 14 and an optical head 15 are disposed in opposed relationship with each other with a magneto-optical disc 10 interposed therebetween. Reference numeral 16 designates a support member for the floating magnetic head 14 and the optical head 15.

The magneto-optical disc 10 has, on one surface of a transparent resin substrate 11 formed with a preformat signal and a guide groove, a recording portion thin film layer 12 comprising an inorganic protective film of $Si_3N_4$ or the like, a magnetic film of TbFeCo or the like and an inorganic protective film of $Si_3N_4$ or the like formed in succession by sputtering, and further has an organic protective film 13 formed thereon.

This protective film 13 can be provided, for example, by one of the film making methods discussed below.

Protective Film Making Method A:

The recording portion thin film layer 12 is spin-coated with a resin composed of an epoxy acrylate ultraviolet ray setting type resin combined with 25% by weight of alumina filler of a desired particle diameter, whereafter the resin is irradiated with an ultraviolet ray lamp (200 mW/cm$^2$) for ten seconds to thereby cure the resin.

Protective Film Making Method B:

The recording portion thin film layer 12 is spin-coated with a urethane acrylate ultraviolet ray setting type resin, whereafter a polyester film of a desired surface roughness is pressed against the resin from above it, and the resin is irradiated through the polyester film with an ultraviolet ray lamp (230 mW/cm$^2$) for thirty seconds while that state is kept, thereby curing the resin, and then the polyester film is removed.

Protective Film Making Method C:

HAC6001 [produced by Rintec (Ltd.)], which is provided by applying a two-liquid thermosetting type urethane resin combined with 20% by weight of an electrically conductive titanium whisker onto a polyester film of a desired surface roughness to thereby cure the resin, thereafter further applying a tackifier onto the urethane resin and heating and drying the tackifier, is stuck onto the recording portion thin film layer 12. The thickness of the thermosetting type resin layer is 5 μm, and the thickness of the tackifier layer is 2 μm. Also, after the HAC6001 has been stuck onto the recording portion thin film layer 12, the polyester film is peeled off.

Also, the magnetic head 14 can be provided, for example, by the following method. Mn-Zn ferrite is worked into a predetermined shape, whereafter the bottom surface thereof is wrapped by a wrapping tape of desired roughness along the direction of movement of the head to thereby give the bottom surface the desired surface roughness. By thus forming the surface roughness by unevenness of directionality along the direction of movement of the head, the magnetic head obtained becomes capable of effecting a more stable floating movement.

By the use of a combination of the magneto-optical disc protective film 13 and magnetic head 14 made by variously varying the particle diameter of the alumina filler used in the above-described protective film making method A, variously varying the surface roughness of the polyester film used in the above-described protective film making method B, variously varying the surface roughness of the polyester film used in the above-described protective film making method C, or variously varying the surface roughness of the wrapping tape used in the above-described magnetic head making method, a CSS test (number of revolutions 3000 rpm) was carried out under the conditions of 25° C. and 60% RH. The result of the test is shown in Table 1 below. The surface roughness is represented by the center line average peak height ($R_{pm}$), and the measurement thereof was effected by the use of a surface roughness meter Talistep produced by Rank Horler Hobson, Inc.

TABLE 1

| Protective film making method | $R_{pm}$ of magnetic head (α) [μm] | $R_{pm}$ of protective film (β) [μm] | (α + β) [μm] | Evaluation result of CSS test |  |
|---|---|---|---|---|---|
| | | | | floatability | presence or absence of sticking |
| Ex. 1 | A | 0.05 | 0.15 | 0.2 | o | absent |
| Ex. 2 | B | 0.2 | 0.2 | 0.4 | o | absent |
| Ex. 3 | C | 0.15 | 0.15 | 0.3 | o | absent |
| Ex. 4 | C | 0.2 | 0.5 | 0.7 | o | absent |
| Ex. 5 | B | 0.05 | 0.75 | 0.8 | o | absent |
| Comp. Ex. 1 | A | 0.05 | 0.05 | 0.1 | o | present |
| Comp. Ex. 2 | B | 0.3 | 0.75 | 1.05 | x | absent |
| Comp. Ex. 3 | C | 0.4 | 0.9 | 1.3 | x | absent |
| Comp. Ex. 4 | C | 0.15 | 0.9 | 1.05 | x | absent |
| Comp. Ex. 5 | B | 0.03 | 0.03 | 0.06 | o | present |

Note: Ex. = Example
Comp. Ex. = Comparative Example

In the column of the evaluation of the floatability of the evaluation result of the CSS test in Table 1, the mark o indicates a state in which the head floats stably, and the mark x indicates a state in which the head does not float stably.

As noted above, in Examples 1 to 5 wherein (α+β) was greater than 0.15 μm and less than 1.0 μm, sticking did not take place between the protective film and the floating magnetic head and the floating distance during the floatation was stable between 1.5 to 1.8 μm. In contrast, in Comparative Examples 1 to 5 wherein (α+β) was outside said range, when (α+β) was too small, sticking sometimes took place, and when (α+β) was too great, the floatation characteristic was sometimes deteriorated to cause head crash, and stable recording and reproduction could not be accomplished. It is further preferable that the surface roughness β represented by the center line average peak height ($R_{pm}$) of the protective film satisfy 0.1 μm ≤ β ≤ 0.85 μm. Also, it is further preferable that the surface roughness α represented by the center line average peak height ($R_{pm}$) of the bottom surface of the magnetic head satisfy 0.03 μm ≤ α ≤ 0.25 μm.

As is apparent from the foregoing description, the present invention is excellent in the floatation characteristic of the magnetic head and can prevent the occurrence of sticking between the head and the magneto-optical recording medium, and can obtain good floatation movability by low friction with the aid of little driving electric power.

What is claimed is:

1. A magnetic field modulation type overwrite magneto-optical recording-reproducing system for effecting the recording of information on a magneto-optical recording medium with the bottom surface of a magnetic head floated and moved relative to a protective film formed on the surface of said magneto-optical recording medium, wherein the surface roughness α of the bottom surface of said magnetic head represented by the center line average peak height ($R_{pm}$) and the surface roughness β of the protective film of said magneto-optical recording medium satisfy the relational expression that 0.15 μm ≤ (α+β) ≤ 1.0 μm.

2. The system of claim 1, wherein the system utilizes a series of contact start and stop operations to effect overwriting.

3. The system of claim 1, wherein the surface roughness of the bottom surface of said magnetic head is formed by unevenness having a directionality along a direction of movement of said head relative to said magneto-optical recording medium.

4. The system of claim 1, wherein the surface roughness α of the bottom surface of said magnetic head represented by the center line average peak height ($R_{pm}$) satisfies the relational expression that 0.03 μm ≤ α ≤ 0.25 μm.

5. The system of claim 1, wherein the surface roughness β of the protective film of said recording medium represented by the center line average peak height ($R_{pm}$) satisfies the relational expression that 0.1 μm ≤ β ≤ 0.85 μm.

* * * * *